United States Patent [19]

Fleischer et al.

[11] Patent Number: 5,031,704
[45] Date of Patent: Jul. 16, 1991

[54] GUIDANCE CONTROL APPARATUS FOR AGRICULTURAL IMPLEMENT

[75] Inventors: Mathew W. Fleischer; John C. David, both of Columbus, Nebr.

[73] Assignee: Fleischer Manufacturing, Inc., Columbus, Nebr.

[21] Appl. No.: 518,207

[22] Filed: May 3, 1990

Related U.S. Application Data

[62] Division of Ser. No. 192,464, May 10, 1988, Pat. No. 4,930,581.

[51] Int. Cl.⁵ .............................................. A01B 69/06
[52] U.S. Cl. ........................................ 172/6; 172/191; 180/131
[58] Field of Search ...................... 172/2, 5, 6, 26, 190, 172/191; 180/79, 131; 104/244.1; 318/580, 587; 280/776; 364/424.01, 424.07

[56] References Cited

U.S. PATENT DOCUMENTS

| | | | |
|---|---|---|---|
| 3,795,285 | 3/1974 | Scholl et al. | 180/103 |
| 4,184,551 | 1/1980 | Orthman | 172/26 |
| 4,228,860 | 10/1980 | Orthman | 172/26 |
| 4,463,811 | 8/1984 | Winter | 172/26 |
| 4,607,716 | 8/1986 | Beck | 172/283 X |
| 4,640,365 | 2/1987 | Schmidt | 172/26 |

OTHER PUBLICATIONS

"The Guide", Brochure by Lincoln Creek Mftg, Owner's Guide and Parts List.
Fleischer Mftg. Inc., "Buffalo All-Flex Cultivator", Sales Brochure.

*Primary Examiner*—Dennis L. Taylor
*Assistant Examiner*—Jeffrey L. Thompson
*Attorney, Agent, or Firm*—Emrich & Dithmar

[57] ABSTRACT

A guidance system for an agricultural implement pulled by a tractor is disclosed. The implement, such as a cultivator or planter, has ground-engaging discs mounted to a frame or toolbar and includes a control hitch mounted to the conventional three-point tractor hitch. The toolbar of the implement is mounted to the control hitch for rotation about a vertical axis. A first sensing device senses the position of the implement relative to a desired lateral position, such as the distance from a crop row, and generates a signal representative of the displacement of the implement from that desired lateral position. The sensing device actuates a hydraulic circuit to turn the implement toolbar toward the desired position; and the discs steer the implement toward the desired lateral position. A second sensing device senses the angular position of the implement relative to the control hitch. When the first sensing device determines that the implement is in the desired lateral position, the second sensing device actuates the hydraulic circuit to rotate the implement toolbar to its normal use position transverse to the direction of travel.

13 Claims, 6 Drawing Sheets

GUIDANCE CONTROL APPARATUS FOR AGRICULTURAL IMPLEMENT

This is a division of application Ser. No. 07/192,464, filed May 10, 1988, now U.S. Pat. No. 4,930,581.

FIELD OF THE INVENTION

The present invention relates to agricultural implements of the type which are pulled by tractors and are used in connection with row crops. More particularly, the present invention relates to a row crop agricultural implement, such as a cultivator or planter, which includes a guidance system for positioning the implement relative to the row so that, for example, in the case of a cultivator, the implement does not drift into the row and thereby destroy a portion of the crop. Moreover, the position of the implement is determined solely by the location of the row, and not the location of the tractor, within limits, of course.

Although the present invention is also useful for planters, particularly ridge planters, as well as other implements, it will be described as embodied in a cultivator. Persons skilled in the art will readily be able to adapt the illustrated embodiments to other applications.

A cultivator typically is arranged so that the cultivating tools, such as residue-cutting coulters, discs or hillers and cultivator sweeps, are mounted to a frame or toolbar and positioned relative to existing crop rows so that when the cultivator is pulled through the field by a tractor, the cultivating tools do not engage the crop, but remove only weeds located in the space between rows. Normally, without any guidance system for the implement, the farmer or tractor operator relies primarily on the location of the tractor wheels relative to the crop rows in front of him in order to determine the proper location of the implement. The farmer may look back to assure himself of proper location, but he relies primarily on his steering of the tractor to position the implement properly and avoid damage to the crop, which is especially prone to damage when it is newly emerging.

Tractor-drawn implements without guidance systems operate satisfactorily on flat land, but even on flat land, the farmer or his hired help may inadvertently steer the tractor, and thus the implement, into the crop, thereby causing damage. The problem of possible crop damage by a cultivator becomes even more apparent when the land is sloped to the side ("side hills"). When a tractor operates on a side hill, it has a tendency to slide downhill. This tendency is overcome by operator skill as the farmer steers the tractor slightly uphill so that the tractor actually moves forward on a slight skew. The amount of skew depends, of course, on the slope of hill, the size and type of tractor, and the type and condition of soil. Moreover, the same downhill forces cause any implement drawn by the tractor similarly to tend to slide downhill.

In order to operate a tractor and implement in all conditions of use, there is required not only considerable operator skill, but also continuous attention by the operator to the operating conditions of the instant; and this attention must be maintained sometimes for hours. Even then, because of the different tractor weights, tire sizes, etc., it is difficult to avoid crop damage under all use conditions.

It has thus become desirable, particularly in the case of row crop cultivators and ridge planters (which plant a new crop on a ridge formed where the previous crop had been sown and harvested) to maintain the drawn implement in a predetermined location relative to the crop rows, independent of the location of the tractor, and, as far as is practicable, independent of operator skill and attention.

SUMMARY OF THE INVENTION

The present invention is directed to a guidance system for an implement which requires no special operation by the farmer, yet maintains the implement in a desired lateral position relative to existing crop rows. Alternatively, the present invention may be used as a guidance system for maintaining an implement in the proper lateral position relative to an established ridge, such as a ridge planter, or to a furrow such as is formed by a conventional marker arm mounted to a toolbar and extending outwardly to the side of a toolbar.

The implement has a frame and a number of discs mounted to the frame. A cultivator typically has a number of discs which are used for cutting residue lying on the ground so that it does not plug the cultivator sweep by straddling it. Similarly, most commercial planters include discs for opening a furrow. Such discs are rigidly mounted to the frame or toolbar (the terms are used interchangeably herein) and serve to stabilize the implement laterally. That is, they resist lateral draft. If the implement does not have its own discs, stabilizing discs or tires may be added, but it is recognized that if discs are rigidly mounted to a frame and the frame is turned, the discs (or other stabilizers, such as tires) will move the implement in the direction in which it is steered.

An auxiliary hitch, referred to as a "control" hitch is mounted to the conventional three-point hitch of the tractor, and the frame or toolbar of the implement is mounted behind the control hitch for pivotal motion about a vertical axis located on the center line of the implement and tractor.

In the illustrated embodiment, a pair of hydraulic cylinders are connected between the control hitch and the implement toolbar, with one cylinder located on either side of the center line.

A first sensor, in the form of an angular resolver having a balanced sensing wand connected to it (hereinafter referred to as the wand or sensing resolver), is mounted to the control hitch with the wand in the form of a wishbone, shaped so that the more widely spaced rear portions of the wand engage the crop of both adjacent rows. If the control hitch moves laterally off-center toward one row and away from the other row, then the wand, since it is balanced, will engage the crop in the nearest row more solidly and be rotated. The wand resolver will generate an electrical signal representative of the rotation of the wand.

The signal of the first sensor actuates a hydraulic circuit which includes the side hydraulic cylinders to rotate the implement frame about its vertical hitch axis in a direction away from the crop row engaged by the sensing wand--that is, the hydraulic circuit turns the implement frame back toward the center line between the crop rows. The fixed discs on the implement then steer the implement back toward the desired lateral position.

A second sensor, which may be a resolver similar to the wand sensor, generates a second signal which signals whether the implement toolbar is rotated toward the left or toward the right to make the correction. When the implement returns to the desired path (i.e., centered between the rows), the second resolver (called the toolbar resolver) actuates the hydraulic cylinders to rotate the toolbar back to its normal use position transverse of the direction of travel.

For reference, "right" and "left" as used throughout, refer to the right and left sides respectively of an operator on the tractor facing the direction of travel. In operation, if the control hitch moves, for example, toward the right of the desired center line, the crop row on the right will cause the wand to rotate clockwise when viewed from above. The wand resolver will then cause the hydraulic cylinders to rotate the implement frame counterclockwise so that it is turned toward the desired center position. In the illustrated embodiment, a hydraulic cylinder on the right side of the center line will retract and the hydraulic cylinder on the left side of the center line will extend. The hydraulic cylinders extend and retract in equal increments. The toolbar resolver generates a second signal representative of the rotation of the implement frame relative to the control hitch. The electronic control circuit will stabilize the hydraulic circuit, in the illustrated embodiment, when both sensor signals are equal.

Returning to the example, as the implement moves back toward the center line, the sensor wand will engage the left row of crop and be turned counterclockwise back to its original position. The toolbar resolver will respond by rotating the implement frame clockwise back to its original use position transverse of the direction of travel when the wand resolver indicates that the hitch axis is on center.

When the signal of the wand resolver indicates that the control hitch is located midway between the adjacent rows of crop and the signal of the toolbar resolver indicates that the frame of the drawn implement is transverse of the direction of travel (that is, parallel to the control hitch), the hydraulic circuit is not actuated, since the implement is at the desired center location and is in proper operating position.

Other features and advantages of the present invention will be apparent to persons skilled in the art from the following detailed description of alternate embodiments accompanied by the attached drawing wherein identical reference numerals will refer to the like elements in the various views.

BRIEF DESCRIPTION OF THE DRAWING

FIG. 1A is a side view of a known cultivator mounted to a toolbar;

DETAILED DESCRIPTION OF THE PREFERRED EMBODIMENT

Figure 1:
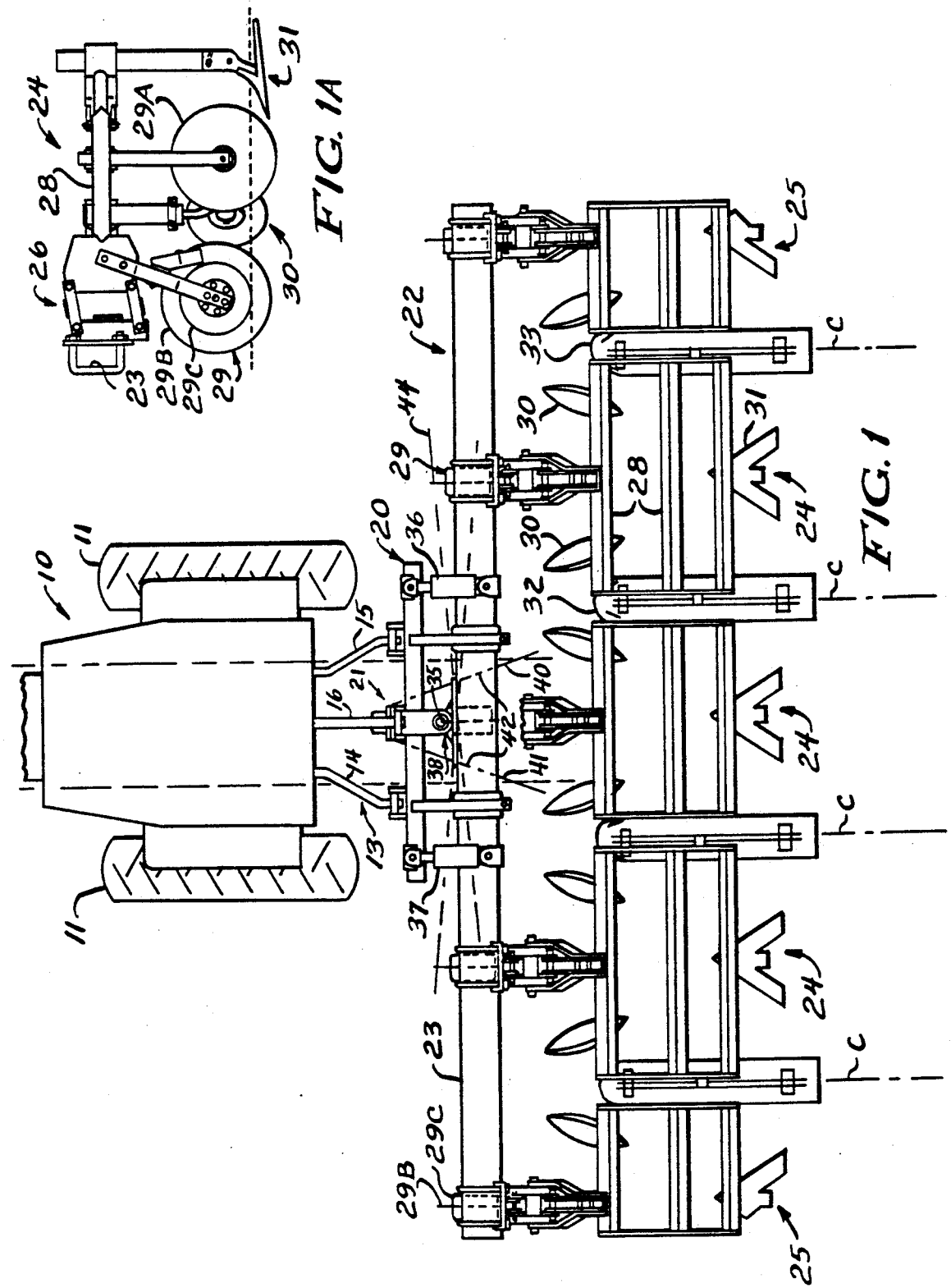
FIG. 1 is a plan view of a row crop cultivator incorporating the inventive guidance system drawn by a tractor, shown diagrammatically and in fragmentary form.

Turning to FIG. 1, reference numeral 10 generally designates an agricultural tractor shown in diagrammatic form and having rear wheels 11 and a conventional three-point hitch generally 13, including first and second draft links 14, 15 which are laterally aligned, and a center lift link 16 which is higher that the draft links 14, 15 and which is actuated by means of a hydraulic cylinder (not shown) for raising the three-point hitch and lifting any implement attached to it, as is well-known. As is also known, the links of the three-point hitch may be locked laterally by sway blocks or permitted to shift within limits laterally by repositioning the sway blocks. When using the illustrated embodiment of the invention, the sway blocks are repositioned to permit the three-point hitch to shift laterally.

Mounted to the three-point hitch is an auxiliary hitch generally designated 20, and sometimes referred to as the control hitch. The control hitch serves as a mount and reference for a first sensor (called a wand resolver) generally designated 21 which determines when the implement is laterally displaced from the desired path which for present purposes may be a center line between adjacent crop rows. The control hitch 20 also couples a cultivator generally designated 22 to the tractor, as will be described presently.

The cultivator 22 may be a commercially available cultivator such as that sold under the trademark "Buffalo" "All-Flex" cultivator, manufactured by Fleischer Mfg., Inc. of Columbus, Nebraska, Models 4600, 4630 or 4640. As persons skilled in the art will readily appreciate, the present invention is not limited to any particular cultivator, but is useful for row crop cultivators in general. Moreover, the invention may be adapted to other row crop implements such as planters or fertilizer applicators. The elements of the cultivator 22 need not be described in detail, but an understanding of the present invention will be enhanced if the primary elements of the illustrated cultivator are understood.

The cultivator 22 of the illustrated embodiment is a four-row cultivator, the four rows of crop being designated C in the drawing For a cultivator of this size, the weight of the implement is such that it may be raised, for example when the tractor exits a field for making an end turn at the end of a row, by means of the tractor three-point hitch 13. Thus, the illustrated cultivator 22 does not have any support wheels. Larger cultivators may have pull-type frames with support wheels and even larger ones may have folding wings which are not shown on the smaller cultivator illustrated in the drawing.

The cultivator 22 includes a frame or toolbar 23. Mounted to the toolbar 23 are three interior cultivator units each generally designated 24 and two end cultivator units designated 25, all of which are conventional. All of the cultivator units 24, 25 are mounted to the toolbar by four-bar linkage mounts such as that designated 26 (FIG. 1A) so that the cultivating units may conform to ground contour independent of one another. Referring to FIGS. 1 and 1A, one of the individual cultivator units 24, will be described briefly. It includes a frame 28 to which is mounted a forward stabilizer disc 29, first and second disc hillers 30 and a central rear sweep 31. The stabilizer disc may be mounted directly to the toolbar 23 or to the unit frame 28 as seen at 29 or 29A in FIG. 1A. The unit frame 28 also carries first and second side crop shields 32, 33 respectively (omitted in FIG. 1A) for protecting adjacent rows of crop C from dirt raised and thrown by the ground-working tools. The central interior cultivator unit 24 is shorter in width but similar in structure since it need not carry the crop shields. The end cultivator units 25 are similar to the interior cultivator nits 24 except they each have only one disc hiller and a partial sweep, as illustrated. The stabilizer disc 29 in t e illustrated embodiment is in the form of a banded coulter including a coulter blade 29B and a depth gauging band 29C. The banded coulters 29 act as stabilizer means because they are mounted to the unit frame 28 in such a way that they are not permitted to rotate about vertical axes although they may raise and lower to conform to ground contour, as described; and the four-bar linkages 26 do not permit the unit frames 28 to move laterally relative to the toolbar 23.

Before describing the details of the structure, it will be helpful to understand the overall apparatus and operation of the guidance system. Briefly, the toolbar 23 of the cultivator 22 is mounted by means of a vertical pivot generally designated 35 to the control frame 20. First and second hydraulic cylinders 36, 37 are mounted between the toolbar 23 and the control hitch 20, and they are connected in hydraulic circuit, as will be described further below, such that when one cylinder extends, the other retracts by an equal amount. A toolbar resolver generally designated 38 is adapted to generate a signal representative of whether the toolbar 23 is in a position parallel to the control hitch 20, or rotated (counterclockwise or clockwise) relative to the control hitch 20. The wand resolver 21 includes a pair of sensing wands 40, 41 (collectively referred to as the wand assembly 42). The assembly is balanced and symmetrical about the center line in the form of a wishbone adapted to engage two adjacent rows of crop C.

To describe the operation briefly, the tractor 10 is located with its rear wheels 11 in the space between adjacent rows of crop C. The sensing wands 40, 41 of the wand resolver 21 engage the emerging crops of adjacent rows continuously during normal operation so that the wand resolver 21 is in the position shown and symmetrical relative to the center line of the apparatus (which centerline passes through the hitch axis 35) If the vertical hitch axis 35 moves off the center line (for example, to the right), then the wand 40 will engage the row of crop to the right, and the wand resolver will rotate clockwise. The wand resolver 21 will then generate an electrical signal indicative of the clockwise rotation of the wand, and it will actuate a hydraulic circuit to cause the cylinder 36 to retract and the hydraulic cylinder 37 to extend, thereby rotating the toolbar 23 (and cultivator 22) counterclockwise about the hitch axis 35. This directs or steers the cultivator 22 to the left—that is, back toward the desired position or path centered between the crop rows C.

When the cultivator 22 rotates counterclockwise to the position indicated by the chain line 44 in FIG. 1, the stabilizer discs 29 (or 29A) on the individual cultivator units act like wheels and force the cultivator to move to the left. That is, the discs 29 will have been steered toward the left by the counterclockwise rotation of the tool bar; and as the cultivator is pulled forward by the tractor, the discs will cause the cultivator to move as a unit toward the left as viewed in FIG. 1. The rear or toolbar resolver 38 generates an electrical signal representative of the angular displacement of the toolbar relative to the control hitch 20. The control circuit receives the signals of both resolvers and will cause the toolbar to rotate back to the normal use position after the wand resolver indicates that the cultivator is back at the desired lateral position. The forward resolver does not necessarily have to measure angular displacement; it could simply measure distance from a crop row. Thus, the sensing system determines when the cultivator has deviated from a desired lateral position (the wand resolver), defines in which direction the deviation has occured (i.e., right or left) and then rotates the cultivator toward the desired or correct position.

The system will correct itself at the desired location when the left wand 41 engages the left row crop C, thereby causing the wand assembly 42 to rotate counterclockwise and once again become symmetrical relative to the center line. When this happens, the signal generated by the toolbar resolver 38 will cause the left hydraulic cylinder 37 to retract and the right hydraulic cylinder 36 to extend, and thereby straighten out the toolbar 23 so that it is transverse of the direction of travel and parallel to the control hitch 20. The control hitch 20 is capable of moving laterally relative to the tractor for a limited distance sufficient to accommodate the operation of the invention because the side links 14, 15 and the lift link 16 of the three-point hitch of the tractor can move to either side within a limited range with the sway blocks repositioned.

It can thus be seen that the guidance system does not require any special control of the discs 29 nor any special modification of the conventional cultivator 22 other than the incorporation of the control hitch 20 and associated electronic and hydraulic circuits to be described.

Figure 2:
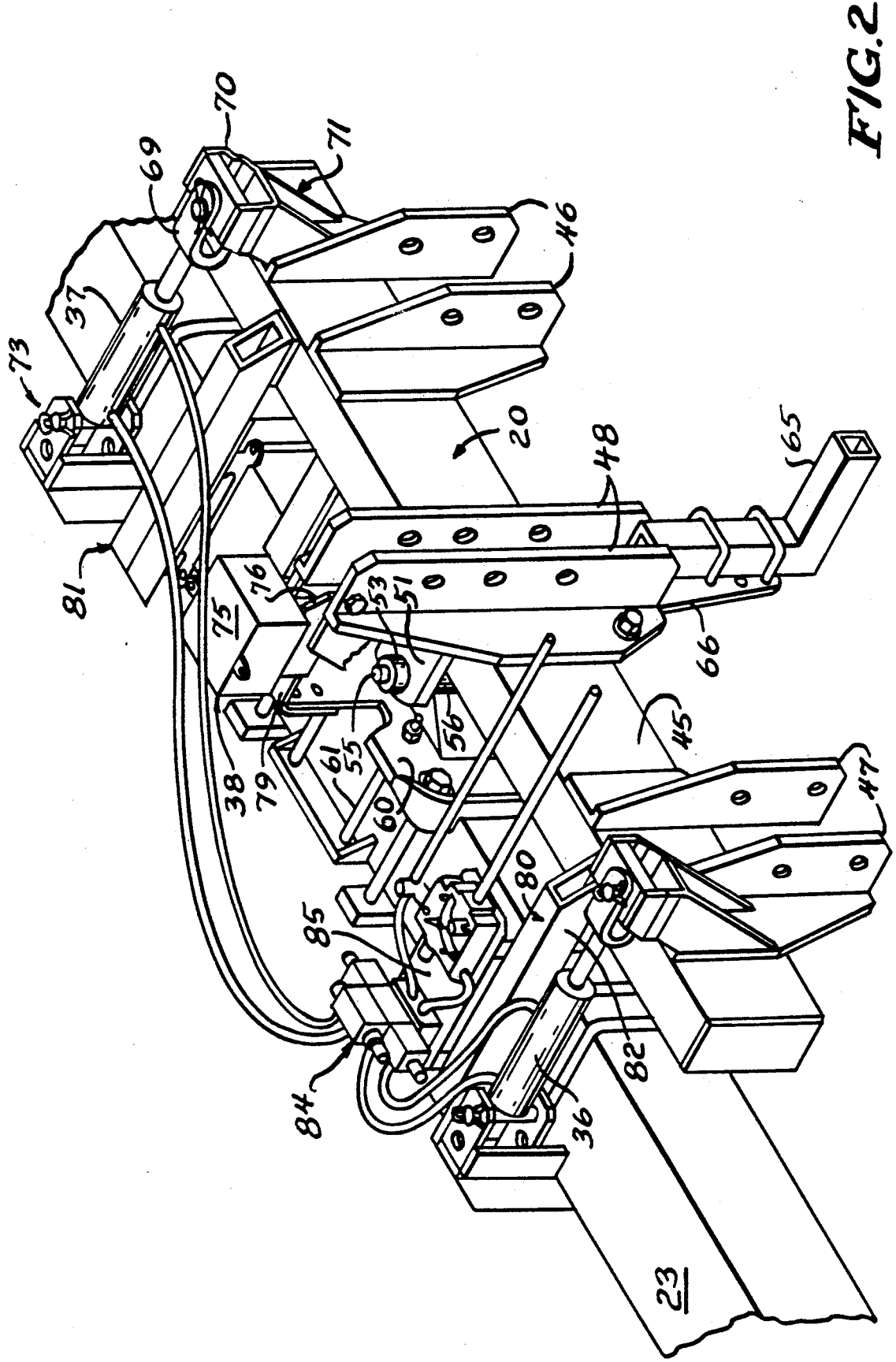
FIG. 2 is a perspective view taken from the upper, right front of the control hitch and implement toolbar, with the toolbar in fragmentary form.

Turning now to FIG. 2, the control hitch 20 includes frame member 45 in the form of a bar which normally is disposed horizontally and extends perpendicular to the direction of travel of the tractor and cultivator First and second pairs of mounting brackets 46, 47 are welded to the front of bar 45 for receiving the rear ends of the side links 14, 15 respectively of the three-point hitch 13; and an upper pair of brackets 48 is also provided for connecting to the rear end of the lift link 16.

Figure 3:
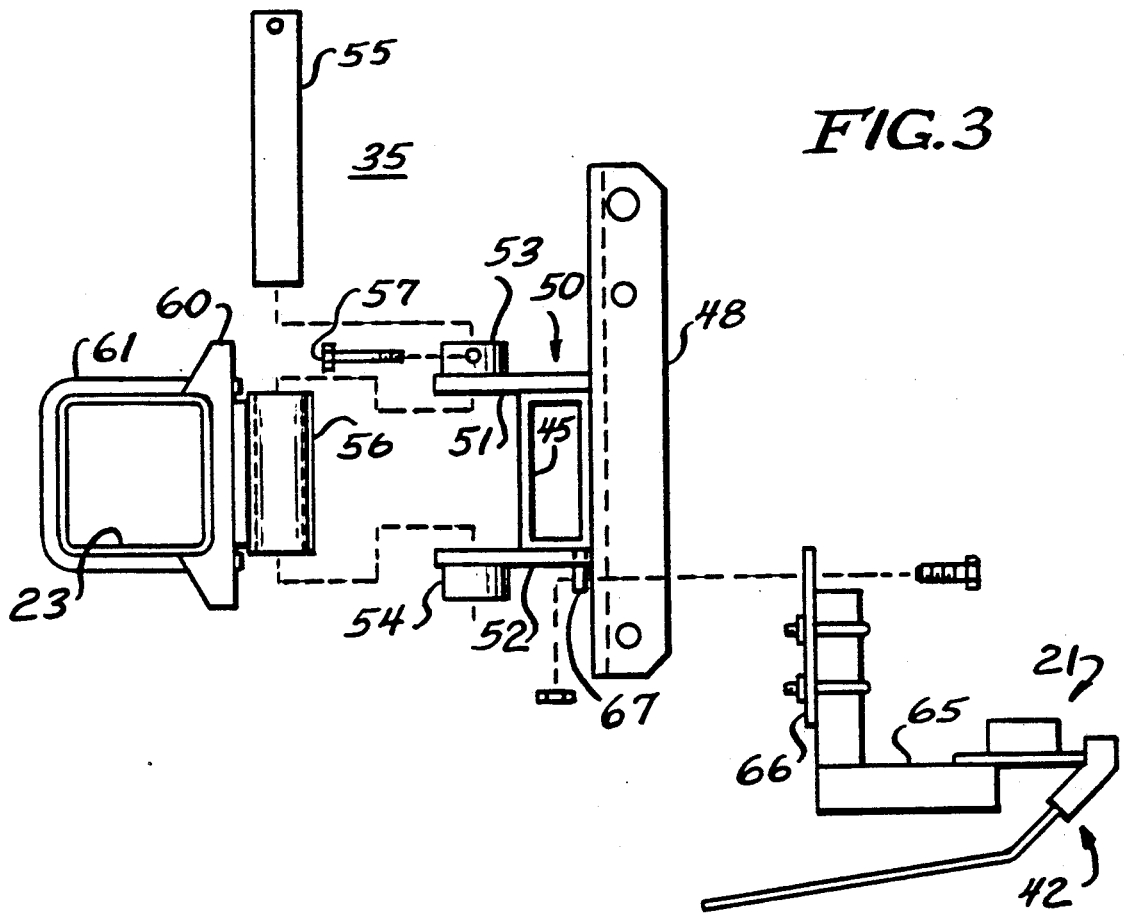
FIG. 3 is a right side view of the control frame, implement toolbar and wand resolver in exploded relation.

The pivot 35 includes a C-shaped mounting bracket 50 having upper and lower flanges 51, 52 is welded to the center of the bar 45 and extends rearwardly thereof, as best seen in FIG. 3. The flanges 51, 52 of the bracket 50 have their rear portions provided with vertically aligned apertures. Collars 53, 54 are welded respectively to the top of the flange 51 and beneath the flange 52 in alignment with the apertures to receive a pivot pin 55. The pivot pin 55 also is received in a pivot tube 56 which fits between the arms 51, 52 of the bracket 50 and is connected to a mounting plate 60 which is bolted to the toolbar 23 of the cultivator by means of mounting U-bolts 61 and nuts. The pivot pin 55 is held in the collars 53, 54 and the pivot tube 56 by means of a retaining bolt 57 received in collar 53 and an aperture in the upper portion of pin 55. The pivot tube 56 may be suitably braced as seen in FIG. 2.

The wand resolver 21, as seen in FIG. 3, is mounted on the forward end of an angle support tube 65 which is mounted by U-bolts to a plate 66 bolted to a flange 67, which is welded to the bottom of the tubular frame 45 of the control hitch 20, as seen in FIG. 2.

Still referring to FIG. 2, the hydraulic cylinder 37 has its rod extending forwardly, and the rod is provided with a clevis 69 which is pivotally mounted to an ear 70 secured by a weldment generally designated 71 to the frame 45 of the control hitch 20. The butt end of the cylinder 37 is pivotally mounted to a similar mount 73 welded to the toolbar 23. The right side hydraulic cylinder 36 is similarly mounted between the frame 45 of the control hitch and the toolbar 23.

Vertical support for the cultivator is provided by a pair of side sliding supports generally designated respectively 80 and 81 in FIG. 2. The slide supports 80, 81 are similar, so that only one of them need be described further. The right side slide support 80 includes upper and lower arms (the upper arm being seen in FIG. 2 and designated 82) which are welded respectively to the top and bottom of the frame 45 of the control hitch 20. The lower surface of the support arm 82 is provided with a low friction bearing material and the upper surface of the lower arm is similarly provided with a bearing material. The support arms of the sliding supports 80, 81 are spaced a vertical distance sufficient to receive and support the toolbar 23 which may be provided with corresponding wear pads. The rear ends of the arms may be secured together by a bolt received through apertures in the rear sections of the arms and a spacer may be located behind the toolbar 23 and between the rear portions of the arms so as to secure them together but to avoid stressing the welds of the forward portion of the arms to the frame 45. Thus, the arms and the structure just described receive the right side of the toolbar 23 in a supporting, sliding engagement which permits the toolbar 23 to rotate about a vertical axis defined by the pivot pin 55 relative to the frame 45, but which reduces the stress on the p tube 56 and its associated bracing and mounting plate 60. The left side sliding support 81 similarly supports the left side of the toolbar 23 in operation. When the tractor three-point hitch is elevated, the control hitch 20 is also raised, and the toolbar 23 and the entire cultivator of the illustrated embodiment are likewise raised.

The toolbar 38 includes a housing 75 mounted by means of a bracket 76 to the upper portion of the right side bracket 48 fixed to the frame 45 of the control hitch 20. A shaft 77 (FIG. 6) is received in a collar 78 secured to a bracket 79 mounted to the plate 60 of toolbar 23 (FIG. 2). The axis of the collar 78 and, therefore, the axis of rotation of the shaft 77 are colinear with the axis of the pivot pin 55 and pivot tube 56. Thus, the shaft 77 rotates about the axis of rotation between the toolbar 23 and the control hitch 20, and the shaft 77 rotates with the toolbar relative to the control hitch and the housing 75. Thus, the angular displacement between the shaft 77 and housing 75 represents the angular displacement of the toolbar 23 relative to the frame 45 of the control hitch 20.

Figure 4:
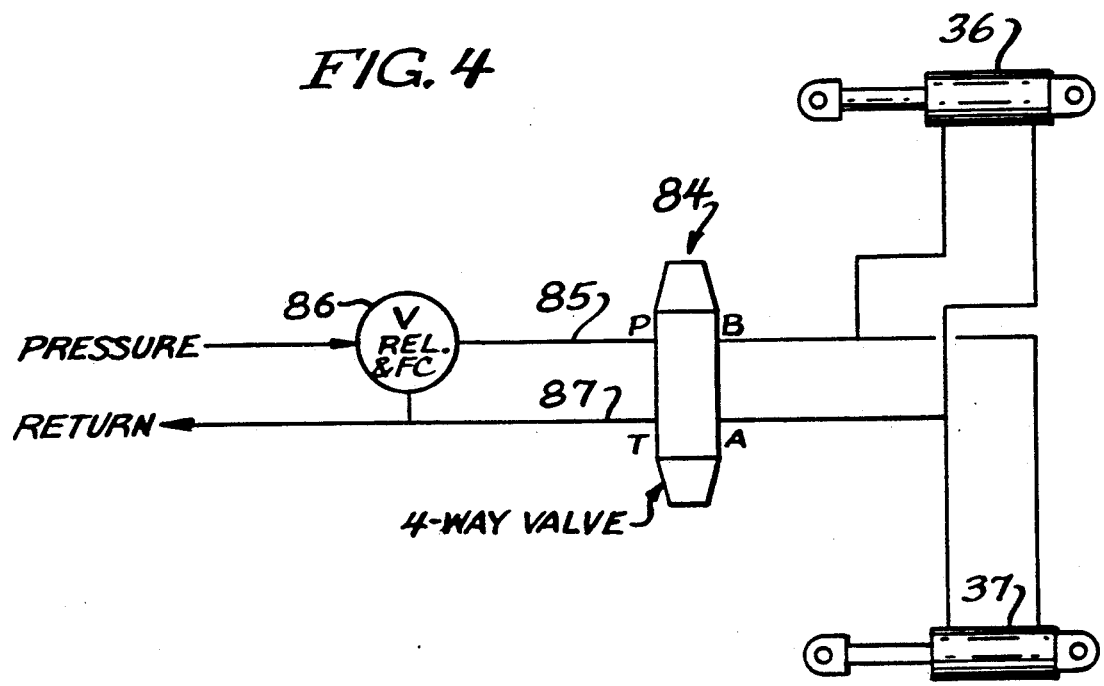
FIG. 4 is a schematic diagram of the hydraulic circuit.

A hyraulic solenoid valve generally designated 84 is mounted by means of a bracket 85 to the toolbar 23. Referring to the schematic diagram of FIG. 4, the valve 84 is a conventional four-way valve which has a high pressure input 85 which is coupled to the pressure output of the tractor hydraulic system via flow control and pressure relief valve 86. Control valve 84 also has a low pressure or return input 87 which is connected to the tractor hydraulic return. One of the outlets, B, of the control valve 84 is coupled by means of hydraulic hose to the rod end of cylinder 36 and the butt end of hydraulic cylinder 37. The other output, A, of the valve 84 is coupled by means of hydraulic hose to the rod end of cylinder 37 and the butt end of the cylinder 36.

Figure 6:
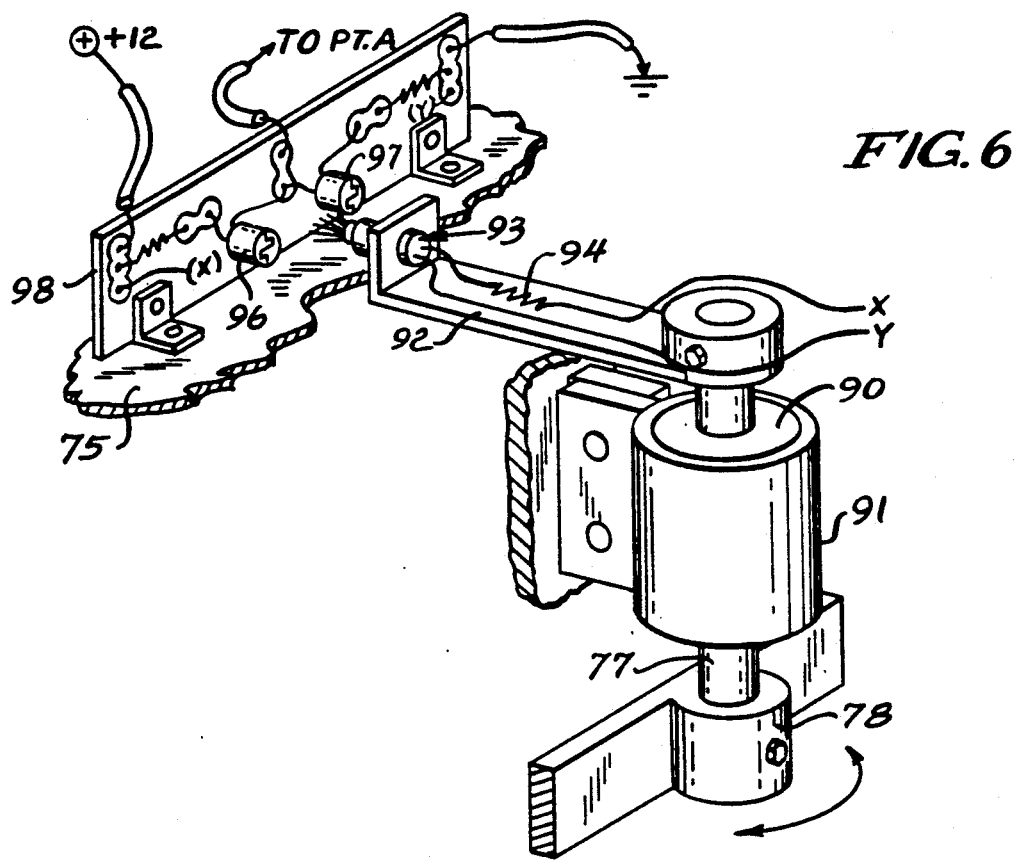
FIG. 6 is a diagrammatic view illustrating the main operating components of the resolvers.

Turning now to FIG. 6, there are shown the principal elements of the wand resolver 21 and toolbar resolver 38 with their protective covers removed. Resolvers of this type are known in the art, and the mechanical details of FIG. 6 are for the toolbar resolver, but the wand resolver is similar in structure and operation, except that the wand sensor is adapted to rotate relative to the control hitch 20, whereas the toolbar resolver indicates relative angular displacement of the toolbar or implement frame relative to the control hitch.

Both resolvers include a shaft such as designated 77. A bearing 90 is received on shaft 77 and mounted in a sleeve 91. The shaft 77 is connected to one of the movable members (i.e., the wand sensor or the toolbar) and the sleeve 91 is mounted to the other. In the case of the wand resolver, the sleeve 91 is mounted to the control hitch 20, and the wands 42 are connected to the shaft 77. In the case of the toolbar resolver, the sleeve 91 is mounted to the frame 45, and the input shaft 77 is connected to the toolbar 23 with axis of the shaft aligned with the axis of the main pivot pin 55.

At the top of the shaft 77, there is mounted a swing arm 92, the distal end of which carries a light emitting diode generally designated 93. The light emitting diode is energized by a source of electricity such as a battery, and it is connected in circuit with the battery by leads X, Y and a bias resistor 94. Thus, the light emitting diode 93 is continuously energized and emits light. A pair of photocells 96, 97 are connected in circuit and mounted to a plate 98 which is mounted in the housing which, in turn, is connected to the sleeve 91. The photocells 96, 97 receive light from the light emitting diode 93, and they are mounted in a common horizontal plane with the light source 93. As the shaft 77 rotates clockwise or counterclockwise in relation to the sleeve 91, more light will be received by one of the photo cells and less light will be received by the other photo cell.

Figure 5:
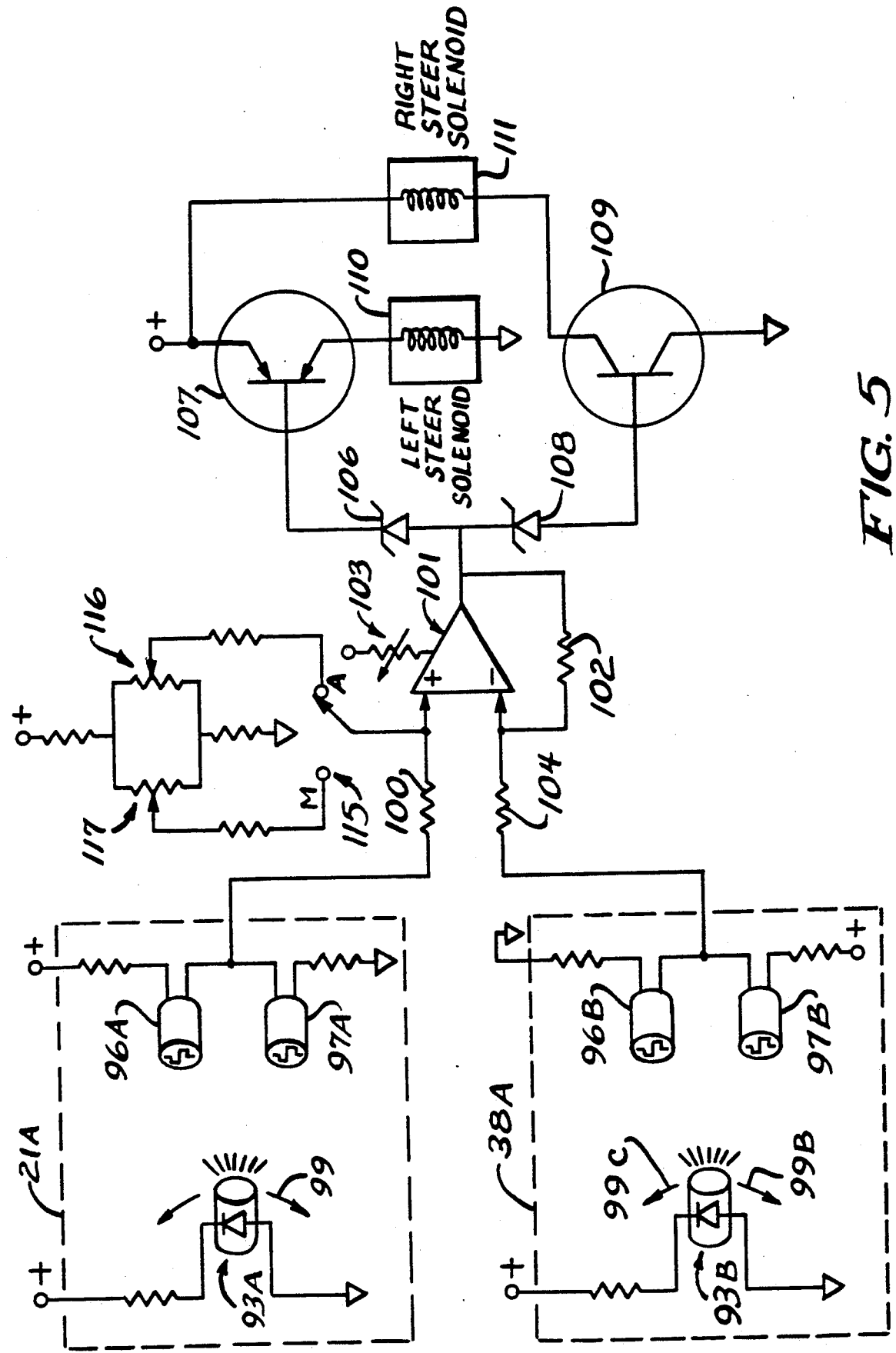
FIG. 5 is a schematic diagram of the electrical control circuit for the apparatus of FIG. 1.

Turning now to FIG. 5, the circuitry of the wand resolver 21 of FIG. 2 is enclosed within the dashed block 21A; and the circuitry of the toolbar resolver 38 is diagrammatically illustrated within the dashed block 38A. The wand resolver 21 includes a light emitting diode 93A and first and second photocells 96A, 97A. The photocell 93A, as indicated, is connected to rotate with the wand assembly 42; and the photocells 96A, 97A are mounted by means of the L-shaped bracket mounting 65 to the control hitch 20. As the right wand 40 engages a row of crop, the wand assembly 42 will rotate clockwise when viewed from above, moving the light emitting diode 93 in the direction of arrow 99 in FIG. 3. Thus, more light from the diode 93A will be received by the photocell 97A than will be received by the photocell 96A. The photocells 96A, 97A are connected in series, together with limiting or bias resistors, so that as more light is received by the photo-cell 97A, its resistance will decrease, and the output signal of the wand resolver 21, will decrease in magnitude The output signal of the wand resolver is fed through a resistor 100 to the positive or non-inverting input of a differential amplifier 101. The amplifier 101 has a negative feedback resistor 102 for stability; and it has an adjustable gain feature diagrammatically illustrated by the variable resistor 103 which adjusts the relative gain between the positive and negative input terminals The adjustable gain permits the amplifier to adjust the response of the system to the two resolvers. That is, the wand resolver 21 can be made more or less sensitive to rotation of the wishbone assembly 42 than the toolbar resolver is made to the rotation of the toolbar 23. This sensitivity adjustment could be accomplished mechanically, but the electrical adjustment is convenient.

The inverting input of the amplifier 101 is received via resistor 104 from the output of the toolbar resolver 38 which includes a light emitting diode 93B and first and second photocells 96B and 97B respectively. The light emitting diode 93B is mounted to rotate with the toolbar 23, and the photocells 96B, 97B are mounted in the housing of sensor 38 which is mounted to the frame 45 of the control hitch 20.

The photocells 96A, 96B may be mounted to one side of the center line (e.g., the left) and photocells 97A, 97B on the other side. However, the polarity of the source voltage is reversed in the circuit. Thus, as the wand assembly 42 rotates clockwise, indicative of the center of the wand resolver being to the right of the desired center line between adjacent rows, more light impinges on the right photocell 97A and the output signal decreases. This will actuate the hydraulic cylinders to rotate the toolbar counterclockwise. When the toolbar 23 rotates counterclockwise as represented by arrow 99C, more light will impinge on the left photocell 96B; and photocell 97B is connected in the circuit such that the output signal of the toolbar resolver will also decrease.

The output of the amplifier 101 is coupled by means of a first zener coupling diode 106 to the input of a high gain amplifier 107 which serves as a semiconductor switch. The switch 107 may be a Darlington transistor pair because of its high input impedence and high gain, but is shown schematically for simplicity as a single transistor. Similarly the output of the amplifier 101 is coupled through a second zener diode 108 to the input of a second semiconductor switch diagrammatically illustrated at 109. The output of the switch 107 is connected to the coil of the left steer solenoid 110, and the switch 109 is connected to the coil of the right steer solenoid 111. Thus, when the switch 107 conducts, the left steer solenoid 110 will be actuated, causing hydraulic fluid under pressure to flow from the tractor output to actuate hydraulic cylinders 36, 37 so that the toolbar 23 will steer toward the left.

The positive or non-inverting input of amplifier 101 is connected to the movable contact of a switch 115, the stationary contacts of which are coupled respectively to potentiometers 116, 117 and suitable biased circuitry. When the switch 115 is set in the position shown, the control circuitry is set for automatic operation; and when the switch is in the complementary position, the system is set for manual operation In automatic operation, the potentiometer 116 is used to adjust the center or null point for the operation of the resolvers. That is to say, with the resolvers in the center position, the potentiometers 116, 117 may be used to adjust the input signal to the amplifier 101 so that there is no output when the resolvers are in the center position. In the manual mode, the potentiometer 117 is used to adjust the center point for the resolvers or to steer the cultivator manually since the switch 115 and potentiometers 116 and 117 are preferrably located in the tractor cab so that the farmer can operate them from the cab.

Figure 7A:
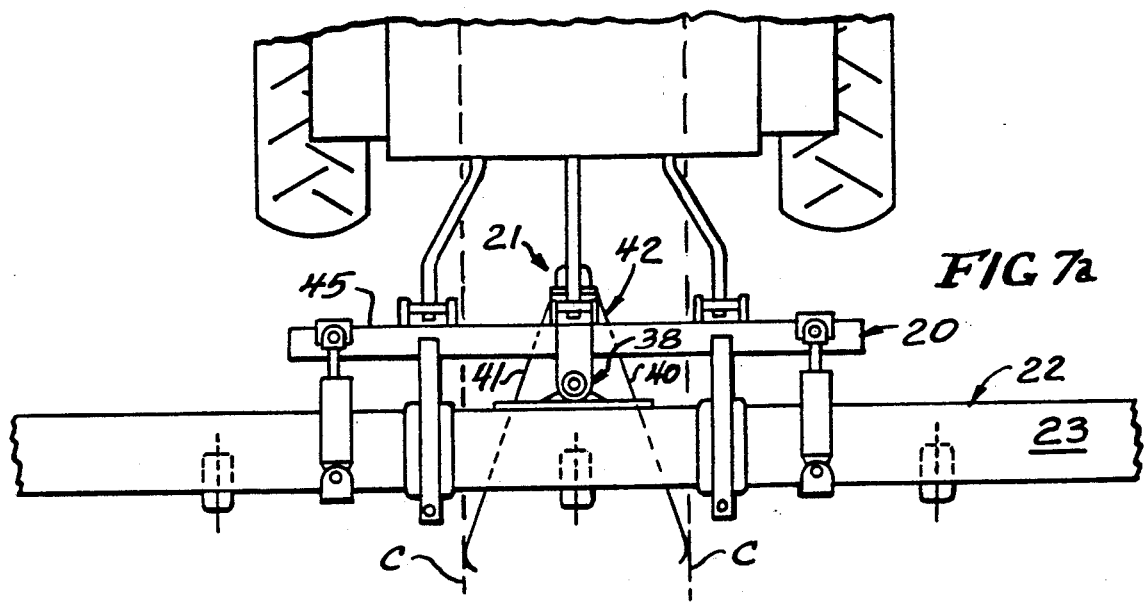
FIGS. 7A-7C are diagrammatic plan views of the system of FIG. 1 showing the main operative elements and illustrating the operation of the system under various conditions.
Figure 7B:
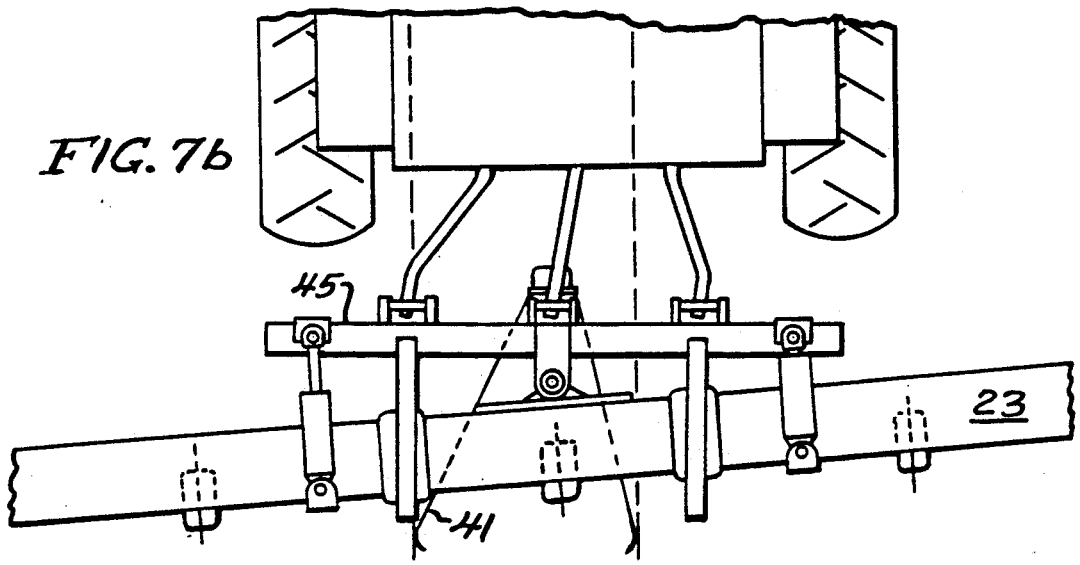
Figure 7C:
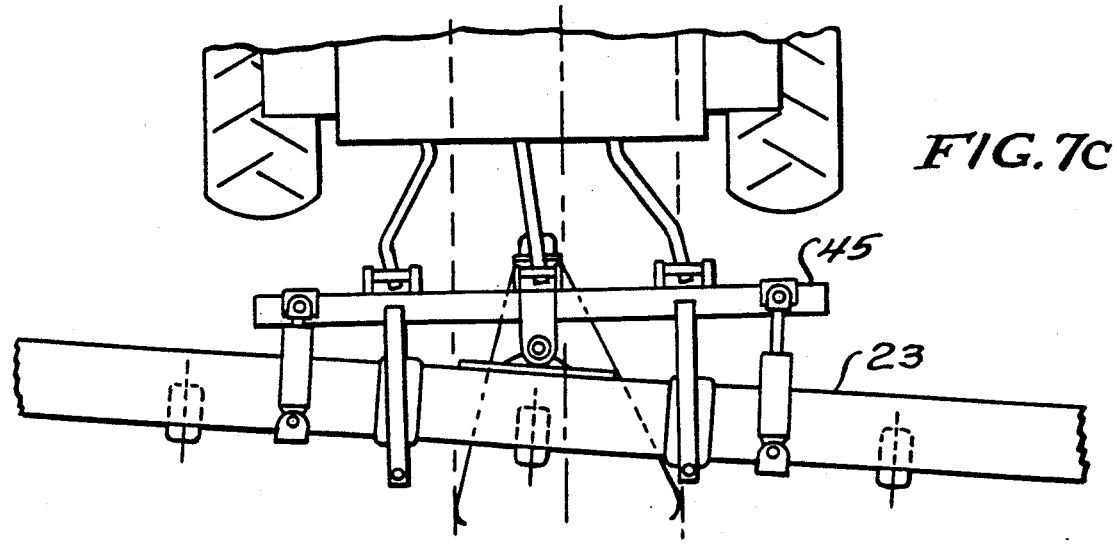

Referring now to FIGS. 7A-7C, in operation, it is desired that the axis of rotation of the shaft of the wand assembly 42 be located on a center line midway between adjacent crop rows C. This is referred to as the "desired path" in this example, but other paths may be desired. The wands 40, 41 engage the adjacent rows equally under normal conditions (that is, when the axis of rotation of the wand assembly is properly centered between the adjacent rows). The axis of the wand assembly 42 and the axis of rotation of the toolbar resolver 38 are located on the center line of the equipment in the illustrated embodiment. If the center line of the implement moves to the right of the desired path (that is the center line between adjacent rows of crop) as illustrated in FIG. 7A, then the wand 40 will engage the right row; and the wand 41 will engage the left row with less force, causing the wand assembly 42 to rotate clockwise when viewed from the top as seen in FIG. 7B. This will cause the light emitting diode of the wand resolver to rotate clockwise also, in the direction of arrow 99 (FIG. 5), whereby the right photocell will receive more light and thereby reduce its resistance. This will cause the output signal of the wand resolver to decrease in magnitude, causing the output of the amplifier 101 to decrease. This will energize the left steer solenoid 110 and cause the hydraulic cylinders 36, 37 to rotate the toolbar 23 counterclockwise so that it faces toward the left, as illustrated in FIG. 7B.

Because the stabilizer discs are rigidly connected to the toolbar 23, the implement 22 will then move to the left as the tractor moves forward. This, in turn, will cause the control frame 20 to shift to the left because the sway blocks are repositioned on the tractor three-point hitch. In summary, the toolbar 23 will be rotated counterclockwise and the axis of the toolbar 23 will maintain the same angular disposition relative to the axis of the frame 45 of the control hitch until the implement moves over to the desired lateral position.

The wand resolver thus determines, measures or detects the position of a predetermined location on the implement (the center in the illustrated embodiment) relative to the ground, crop or furrow.

The rotation of the toolbar 23 in a counterclockwise direction will be sensed by the toolbar resolver 38, causing the light emitting diode 93B to rotate counterclockwise in the direction of the arrow 99C (FIG. 5). This causes more light to fall on the photocell 96B, thereby decreasing the output signal of the toolbar resolver 38. That output signal will continue to decrease until it equals the output signal of the wand resolver 21. The implement will rotate counterclockwise until the two signal outputs from resolver 21, 38 are equal. The ratio of these signals can be changed by adjusting resistor 103 or by changing the mechanical dimensions in the rotary elements of the sensors, but with all else equal, the output of amplifier 101 will return to the midpoint of its range at which neither switch 107 or 109 is conducting when the implement is rotated counterclockwise the same angular displacement (e.g., 2°) as the wand assembly is rotated clockwise.

When the wand resolver 21 is returned to the desired path, i.e., centered between the rows, the left wand 41 will engage the left row crop more steadily, thereby rotating the wand assembly 42 counterclockwise back to its normal position. When the axis of the wand resolver returns to the desired center position, the output signal returns to its normal value, but the output signal of the toolbar resolver will remain low because the toolbar 23 is still turned counterclockwise (that is, it is directed toward the left). Thus, the output signal of the amplifier 101 will increase; and this will cause the switch 109 to conduct, thereby energizing the right steer solenoid until the toolbar 23 counter-rotates to its normal use position transverse of the direction of travel and parallel to the frame 45.

The system will operate in a similar but complementary manner if the wand resolver moves to the left of the desired path. Thus, for example, if the implement moves to the left of center, as illustrated in FIG. 7C, the wand resolver will actuate the hydraulic cylinders to rotate the toolbar clockwise so that the implement is steered back toward the desired position.

Even though both of the resolvers 21 and 38 of the illustrated embodiment operate on a similar principal and have similar structure, they serve different functions; and, therefore, different types of resolvers could be employed. The resolver 21 measures lateral displacement from a desired path, whether the path is considered to be the center line between adjacent rows or one of the rows itself. This resolver could equally well be a linear sensor, and the desired path could either be an existing row of crop or, as indicated, in the case of a planter, the desired path could be a ridge on which the crop was previously planted and harvested, or it could be a furrow left by a more conventional row crop planter having a marker arm.

The toolbar resolver determines the angular position of the implement relative to a line parallel to the direction of travel, and it causes the implement to be directed in its normal use position when the implement is following the desired path. In the illustrated embodiment, the forward or position resolver is not connected directly to the implement, but it is located on a line extending in the direction of travel which passes through the vertical hitch axis of the implement. Thus, it does measure deviation of the implement by measuring the displacement of its hitch axis even though the implement may be rotated to one side or the other.

Figure 8:
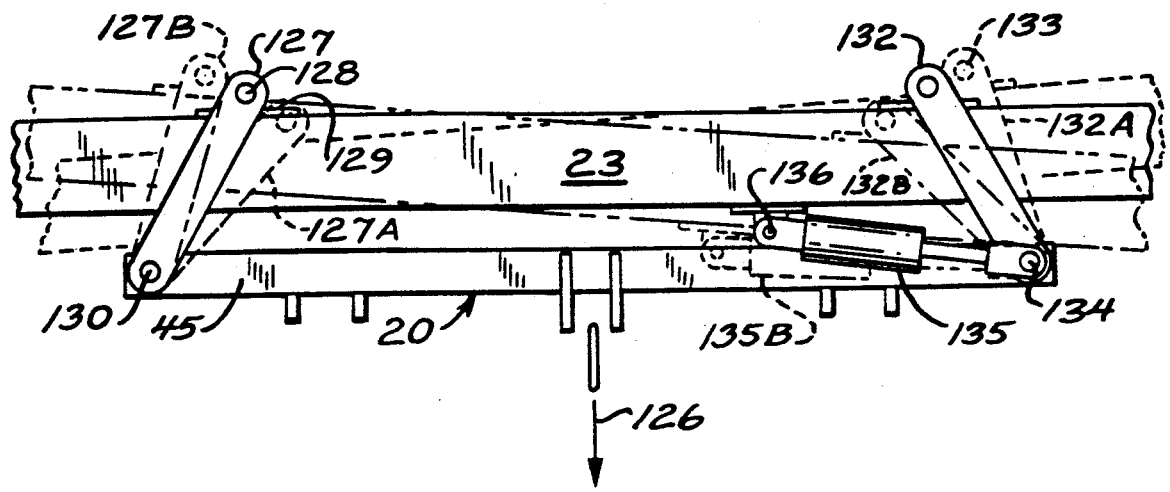
FIG. 8 is a plan view of an alternate arrangement of hitch, toolbar and hydraulic cylinder.

Turning now to FIG. 8, there is shown an alternative embodiment of the connection between the control hitch 20 and the toolbar 23. In FIG. 8, the implement would be at the top of the page and the tractor at the bottom of the page, drawing the implement in the direction of the arrow 126. The right side of the frame member 45 of the control hitch 20 has attached to it upper and lower draft links, the upper one being shown and designated 127. The rear portions of the draft links 127 are connected to a spindle 128 which is mounted by means of a plate 129 to the rear surface of the toolbar 23. The forward ends of the draft links 127 are connected to the frame member 45 by means of a vertical pivot pin 130.

Similarly, the left side of the control hitch 20 and toolbar 23 are connected by upper and lower parallel draft links 132 (only the upper ones being seen in FIG. 8, but the lower one being connected directly beneath the toolbar 23). The rear ends of the draft links 123 are connected to the toolbar 23 by means of a spindle 133; and the forward ends of the draft link 132 are connected to the control hitch by means of a pivot pin 134. A hydraulic cylinder 135 has its rod end connected to the pivot pin 134 on the control hitch, and its base end pivotally connected at 136 to the toolbar 23.

The structure of FIG. 8 may be used in the system as otherwise described above such that when the wand resolver senses that the control hitch has moved too far to the right, the control circuitry causes the hydraulic cylinder 135 to retract. This causes the draft links 132 to rotate clockwise about the pivot pin 134 to the position shown in dashed line at 132A. This causes the left side of the toolbar to move slightly rearwardly. At the same time, the draft links 127 are rotated clockwise about the pin 130 to the position shown at 127A, and this causes the right side of the toolbar to move slightly closer to the control hitch. This action causes the toolbar to steer toward the left, back to the desired path, as viewed in FIG. 8.

Similarly, if the control hitch is sensed by the wand resolver to have moved to the left, the hydraulic cylinder 135 is extended as indicated at 135B, causing the draft links 132 to rotate to the position indicated at 132B, and the links 127 to rotate to the position indicated at 127B, thereby causing the toolbar 23 to be rotated to face toward the right.

Having thus disclosed in detail two embodiments of the invention, persons skilled in the art will be able to modify certain of the structure which has been illustrated and to substitute equivalent elements for those disclosed while continuing to practice the principle of the invention. For example, the guidance system of the present invention could be adapted for use in guiding implements having wheel-supported frames, wherein the implements are supported on their own wheels and the implement frame is raised relative to its own wheels, as distinguished from the cantilever arrangement of the illustrated embodiments. It is, therefore, intended that all such modifications and substitutions be covered as they are embraced within the spirit and scope of the claims.

We claim:

1. Apparatus for guiding a tractor-drawn implement relative to a desired path comprising: an implement frame, a plurality of discs mounted to said implement frame for rotation about horizontal axes, said discs being mounted to said frame such that they cannot turn about vertical axes; hitch means for connecting said implement frame to said tractor for permitting said implement frame to rotate about a vertical hitch axis; sensor means including a first sensor for sensing the displacement of said implement frame relative to said desired path of travel and a second sensor for sensing the angular orientation of said implement frame about said hitch axis; and power actuator means responsive to said sensor means for turning said implement frame about said vertical hitch axis in a first angular direction thereby to steer said implement toward said desired path when said sensor means senses a deviation of said implement frame from said desired path, said discs thereupon coacting with the soil to move said implement toward said desired path as said implement is drawn forward, said power actuator means being further responsive to said sensor means for rotating said implement frame counter to said first angular direction and back to the normal use position when said sensor means detects that the implement frame is at a location on said desired path.

2. The apparatus of claim 1 wherein said power actuator means includes control circuit means responsive to said first sensor for actuating said power actuator means to turn said implement toward said desired path when said first sensor detects that said implement has deviated from said path.

3. The apparatus of claim 2 wherein said power actuator means is further responsive to said second sensor for rotating said implement frame in said counter angular direction when said first sensor senses that said implement frame has been returned to a position on said desired path.

4. The apparatus of claim 3 wherein said hitch means comprises a control hitch including a transverse frame member adapted to be mounted to a hitch of said tractor, and means for connecting said implement frame to said control hitch for rotation about a vertical axis located generally on the center line of said tractor and implement.

5. The apparatus of claim 4 wherein said tractor includes a three-point hitch including a lift arm for lifting said control hitch, said control hitch further including first and second sliding support means mounted on said transverse frame member and located respectively to either side of said vertical hitch axis and extending rearwardly for engaging said implement frame for raising the implement while permitting said implement frame to rotate over a limited range relative to said control hitch.

6. The apparatus of claim 4 wherein said first sensor means comprises a wand resolver carried by said control hitch.

7. The apparatus of claim 6 wherein said first sensor comprises: wand means for simultaneously engaging adjacent rows of crop when the axis of rotation of said hitch frame is on the desired position; means for mounting said wand means for rotation about a vertical axis; and electrical circuit means for detecting the rotation of said wand means and for generating a signal representative of the rotation of said wand means relative to a desired angular position, said wand means being rotated in one direction when it is closer to one crop row and in a counter direction when it is closer to an adjacent crop row.

8. The apparatus of claim 1 wherein said implement is a row crop cultivator and said implement frame comprises a toolbar near the front of said cultivator, and wherein said discs are mounted to said cultivator by means permitting said discs to raise and lower to follow ground contour but restraining said discs against rotation about vertical axes relative to said toolbar.

9. The apparatus of claim 8 wherein said means for connecting said implement frame to said control hitch comprises pivot means defining a vertical pivot axis located between said control hitch and said implement frame and generally on the center line of said implement, whereby said power actuator means rotates said implement frame about said vertical pivot axis.

10. Apparatus for guiding an implement relative to a desired path, said implement adapted to be drawn by a tractor and comprising a frame and a plurality of ground-engaging rotating discs mounted to said frame such that said discs may not rotate about a vertical axis relative to said implement frame; hitch means for connecting said implement frame to said tractor for permitting said implement frame to rotate about a vertical hitch axis; first sensor means for sensing the position of a location on said implement frame relative to said desired path; power actuator means responsive to said first sensor means for turning said implement frame about said vertical hitch axis and toward said desired path when said first sensor means senses a deviation of the position of said implement frame from said desired path, whereby said discs coact with the soil to move said implement toward said desired path when said tractor pulls said implement forward; and second sensor means sensing the angular position of said implement frame about said vertical hitch axis, said power actuator means being responsive to said second sensor means and further operative to rotate said implement frame in an angular direction counter to said first angular direction and back to a normal use position when said first sensor detects that said implement frame is substantially on said desired path.

11. Apparatus for guiding an implement relative to a desired path, said implement adapted to be drawn by a tractor and comprising a frame and ground-engaging stabilizer means attached to said frame such that said stabilizer means may not normally rotate about a vertical axis relative to said implement frame; hitch means for connecting said implement frame to said tractor for permitting said implement frame to turn relative to the line of travel of said tractor; first sensor means for sensing the position of said implement frame relative to said desired path; power actuator means responsive to said first sensor means for turning said implement frame in a first direction toward said desired path when said first sensor means senses a deviation of the position of said implement frame from said desired path, whereby said stabilizer means coacts with the soil to move said implement toward said desired path when said tractor pulls said implement forward; and second sensor means sensing the angular position of said implement frame relative to said hitch means, said power actuator means being responsive to said second sensor means and further operative to turn said implement frame in a direction counter to said first direction and back to a normal use position when said first sensor means detects that said implement frame is substantially on said desired path.

12. The apparatus of claim 11 wherein said hitch means comprises a control hitch including an elongated frame member extending transverse of the direction of travel of said tractor and adapted to be mounted to the hitch of said tractor; and wherein said apparatus further comprises means for mounting said implement frame to said control hitch, said power actuator means being connected between said control hitch and said implement frame.

13. The apparatus of claim 12 wherein said means for connecting said implement frame to said control hitch comprises draft link means interconnecting said control hitch and said implement frame in a four-bar linkage arrangement causing said implement frame to turn in the desired direction relative to said control hitch when said power actuator means is actuated by said first and second sensor means.

* * * * *